United States Patent
Guering

(10) Patent No.: US 11,542,012 B2
(45) Date of Patent: Jan. 3, 2023

(54) POLYARTICULATED AERIAL WORKSTATION

(71) Applicant: Airbus Operations SAS, Toulouse (FR)

(72) Inventor: Bernard Guering, Montrabe (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 349 days.

(21) Appl. No.: 16/855,329

(22) Filed: Apr. 22, 2020

(65) Prior Publication Data
US 2020/0339263 A1    Oct. 29, 2020

(30) Foreign Application Priority Data
Apr. 26, 2019 (FR) ..................................... 1904438

(51) Int. Cl.
*B64D 11/06* (2006.01)
*B60N 2/34* (2006.01)
*B60N 2/22* (2006.01)

(52) U.S. Cl.
CPC ............. *B64D 11/064* (2014.12); *B60N 2/34* (2013.01); *B60N 2/2209* (2013.01); *B64D 11/0642* (2014.12); *B64D 11/0643* (2014.12); *B64D 11/06395* (2014.12)

(58) Field of Classification Search
CPC ................................ B64D 11/064; B60N 2/34
See application file for complete search history.

(56) References Cited

U.S. PATENT DOCUMENTS

| 4,834,452 | A | * | 5/1989 | Goodrich | B64D 11/064 297/240 |
| 4,842,333 | A |  | 6/1989 | Meiller | |
| 5,220,849 | A |  | 6/1993 | Lande et al. | |
| 2008/0009958 | A1 | * | 1/2008 | Abt | 700/29 |
| 2015/0008709 | A1 | * | 1/2015 | Erhel | B64D 11/064 297/217.2 |
| 2016/0075260 | A1 |  | 3/2016 | Atger et al. | |

FOREIGN PATENT DOCUMENTS

| EP | 0303720 A1 | 2/1989 | |
| EP | 850834 A1 * | 7/1998 | B64D 11/00 |
| EP | 2998222 A1 | 3/2016 | |
| FR | 3051176 A1 | 11/2017 | |
| FR | 3070373 A1 | 3/2019 | |
| WO | 2019012025 A1 | 1/2019 | |

OTHER PUBLICATIONS

French Search Report; priority document.

* cited by examiner

*Primary Examiner* — Anthony D Barfield
(74) *Attorney, Agent, or Firm* — Greer, Burns & Crain, Ltd.

(57) ABSTRACT

An aerial workstation which comprises a seat having a sitting portion, a backrest that is connected by a first articulation that allows the backrest to pivot relative to the sitting portion, and an arm configured to position the seat in various positions and orientations in space as required. The aerial workstation makes it possible to be able to translate the seat in a cockpit in an introduction direction, and to make it pivot about a pivot axis that coincides with the direction of introduction within the cockpit.

11 Claims, 12 Drawing Sheets

POLYARTICULATED AERIAL WORKSTATION

CROSS-REFERENCES TO RELATED APPLICATIONS

This application claims the benefit of the French patent application No. 1904438 filed on Apr. 26, 2019, the entire disclosures of which are incorporated herein by way of reference.

FIELD OF THE INVENTION

The present application relates to a polyarticulated aerial workstation.

BACKGROUND OF THE INVENTION

FIGS. 1 and 2 show, schematically, two steps of a method for assembling a nose 10 of an aircraft, also described in patent application FR3051176.

Like all segments, the nose 10 comprises a primary structure 12 which comprises transverse stiffeners called frames, longitudinal stiffeners called stringers and a skin which forms the outer envelope of the aircraft. The nose 10 comprises a floor 14 which divides the nose 10 into two regions, an upper region which corresponds to a cockpit 16 and a lower region which corresponds to an avionics bay 18. The nose 10 also comprises a secondary structure 20 which comprises panels that partition and cover the interior of the primary structure 12, and various accessories and items of equipment and furniture that are connected to the primary structure 12.

According to this assembly method, in parallel with the assembly of the primary structure 12, the elements of the secondary structure 20 are positioned and secured on a self-supporting assembly module 22, as illustrated in FIG. 1.

Then, the self-supporting assembly module 22 is introduced into the primary structure 12, as shown in FIG. 2. Finally, the self-supporting assembly module 22, held by a positioning tool, is connected to the primary structure 12 by fasteners at multiple attachment points positioned in particular in the cockpit 16.

The step of installing the fasteners is relatively difficult since the positioning tool takes up a lot of space in the cockpit. If the windscreens of the cockpit 16 have not yet been installed, certain fasteners can be installed by operators positioned outside the nose 10, by passing through the openings 24 provided for the windscreens. However, this solution is not satisfactory since some fasteners are not accessible—or accessible only with difficulty—for an operator positioned outside the nose 10, passing through the openings 24 provided for the windscreens.

This operation of installing the fasteners is not easy to automate since it is not 100% reproducible, requires adaptability and the use of both hands.

SUMMARY OF THE INVENTION

The present invention seeks to remedy all or some of the drawbacks of the prior art.

To that end, the invention relates to an aerial workstation characterized in that it comprises:

a seat having a sitting portion, a backrest, a restraint system configured to hold an operator on the seat during operation, and a first articulation connecting the backrest and the sitting portion, configured to allow the backrest to be able to move relative to the sitting portion, between a raised position in which the backrest and the sitting portion form approximately a right angle, and a reclined position in which the backrest and the sitting portion form an angle of greater than 150°, and an arm having a first end connected to a base and a second end connected to the seat, comprising at least one connection configured to allow the seat to translate in at least one direction of translation, and/or to pivot about at least one axis of rotation.

The aerial workstation allows an operator to intervene, in total safety, at various elevated points on the aircraft. When the aerial workstation is used to install fasteners in a cockpit of an aircraft, it makes it possible to install fasteners that are not accessible—or accessible only with difficulty—from outside the nose of the aircraft.

According to another feature, the arm comprises at least one connection configured to allow the seat to translate in at least one direction of translation, and to pivot about at least one axis of rotation that coincides with the direction of translation.

According to another feature, the arm comprises at least one first segment oriented in a first direction and connected to the base, a second segment oriented in a second, longitudinal direction and connected to the seat, and a first connection that connects the first and second segments and is configured to allow the second segment to translate with respect to the first segment in a direction of translation parallel to the longitudinal direction and to pivot on itself with respect to the first segment about an axis of rotation parallel to the longitudinal direction.

According to another feature, the arm comprises a second connection which connects the first segment and the base and is configured to allow the first segment to translate with respect to the base in a direction of translation parallel to the vertical direction, and/or to pivot on itself with respect to the base about an axis of rotation parallel to the vertical direction.

According to another feature, the arm comprises at least one first connection configured to allow the seat to translate in a direction of translation, and at least one second connection configured to allow the seat to pivot about at least one axis of rotation that coincides with the direction of translation.

According to another feature, the workstation comprises an articulation which connects the second end of the arm and the seat and is configured to make the seat pivot with respect to the arm about a pivot axis.

According to another feature, the seat is a bucket seat.

According to another feature, the restraint system is a harness of the wraparound type, configured to form, with the sitting portion and part of the backrest, a sheath in which an operator is positioned during operation.

According to another feature, each articulation of the seat and/or each connection of the arm is motorized, and the aerial workstation comprises a controller for commanding each articulation of the seat and/or each connection of the arm.

According to another feature, the controller comprises a program that is configured to move the seat along a succession of intervention points, immobilizing it at each one of the intervention points.

According to another feature, the aerial workstation comprises at least one control configured to inform the controller so that it initiates a transfer from one intervention point to another.

The invention also relates to an assembly station for an aircraft nose, comprising at least one aerial workstation according to one of the preceding features.

BRIEF DESCRIPTION OF THE DRAWINGS

Other features and advantages will emerge from the following description of the invention, which description is given solely by way of example, with reference to the appended drawings in which.

DETAILED DESCRIPTION OF THE PREFERRED EMBODIMENTS

Figure 1:
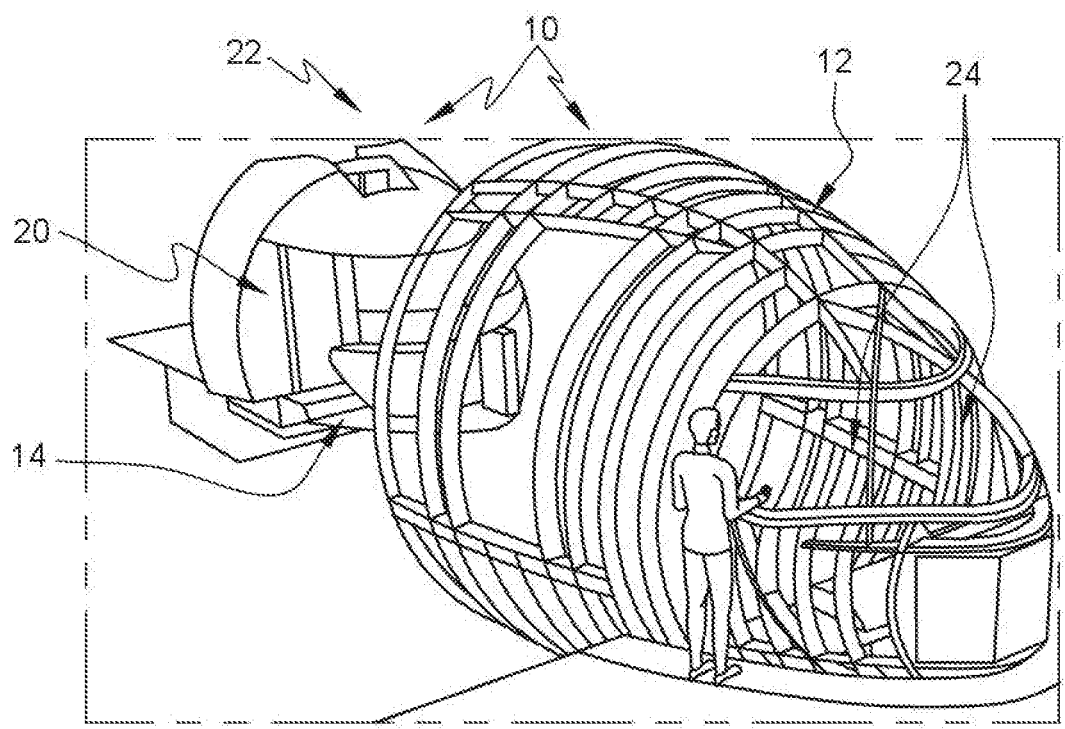
FIG. 1 is a perspective view of a nose of an aircraft prior to installation of an assembly module supporting elements of a secondary structure which illustrates one embodiment of the prior art.
Figure 2:
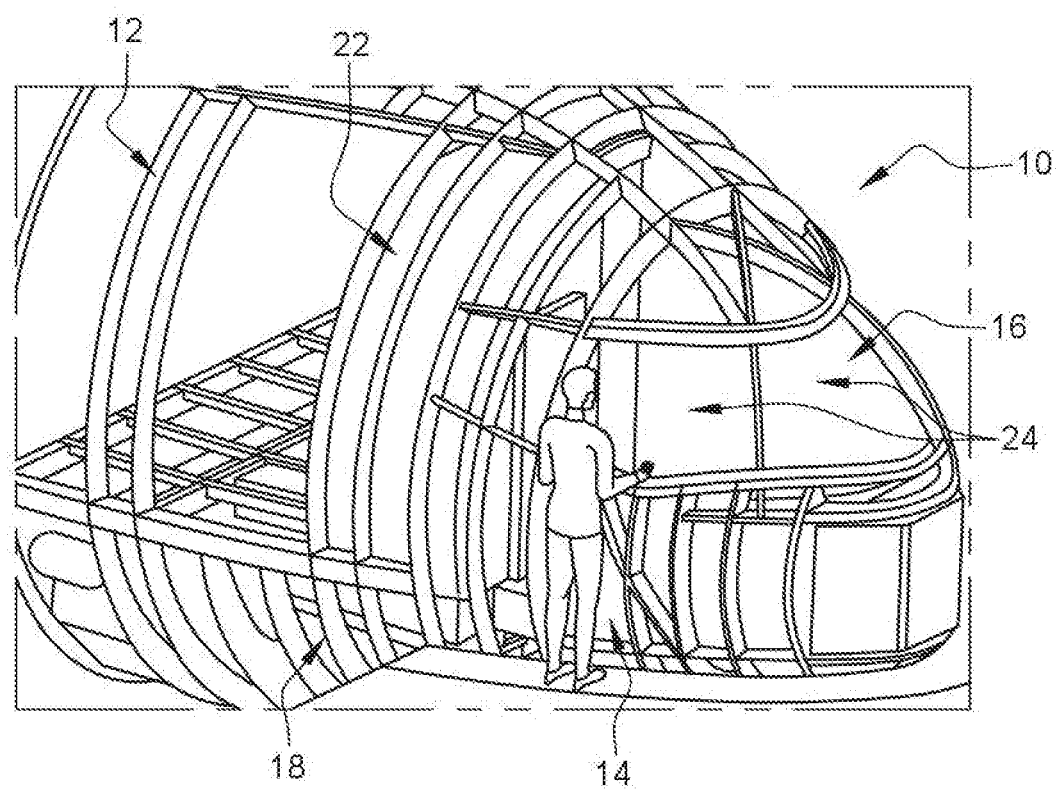
FIG. 2 is a perspective view of the nose shown in FIG. 1 after installation of the assembly module.
Figure 3:
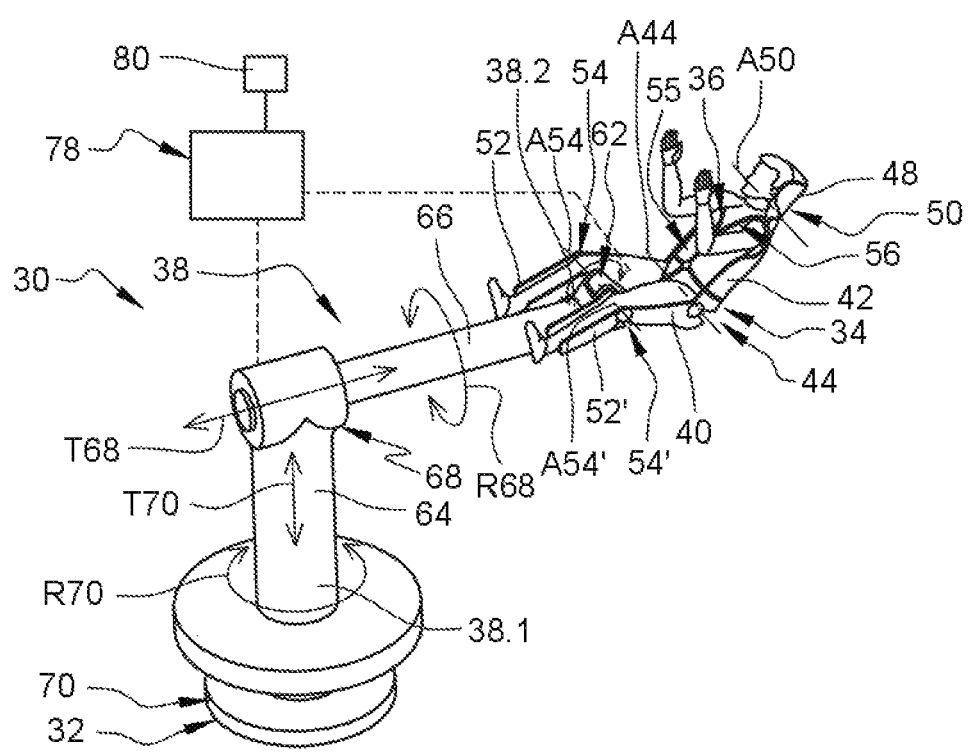
FIG. 3 is a perspective view of an aerial workstation which illustrates a first embodiment of the invention.
Figure 4:
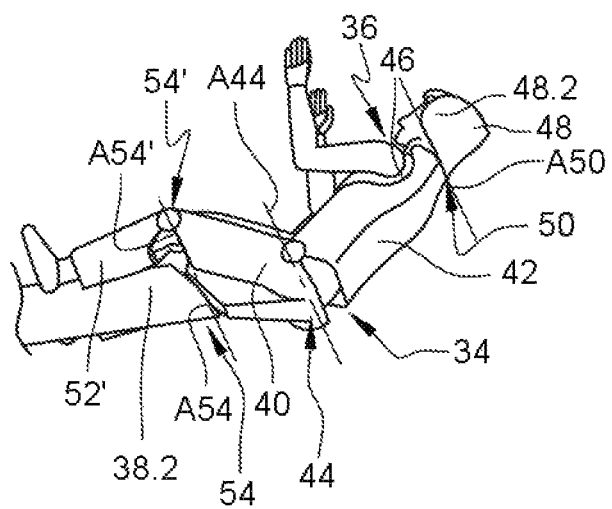
FIG. 4 is a perspective view of a seat of an aerial workstation which illustrates one embodiment of the invention.

As shown in FIG. 3, an aerial workstation 30 comprises a base 32, a seat 34 configured to receive an operator 36, and an arm 38 having a first end 38.1 that is connected to the base 32 and a second end 38.2 that is connected to the seat 34.

Figure 6:
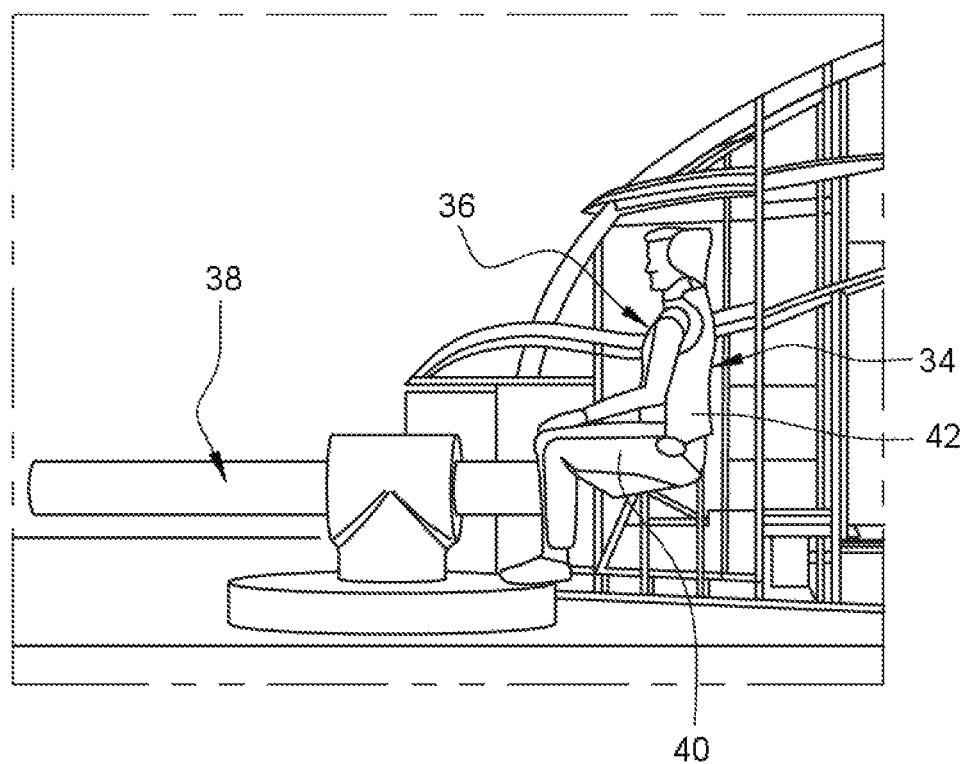
FIG. 6 is a perspective view of the aerial workstation of FIG. 3, with a backrest in the raised position in a starting position.
Figure 8:
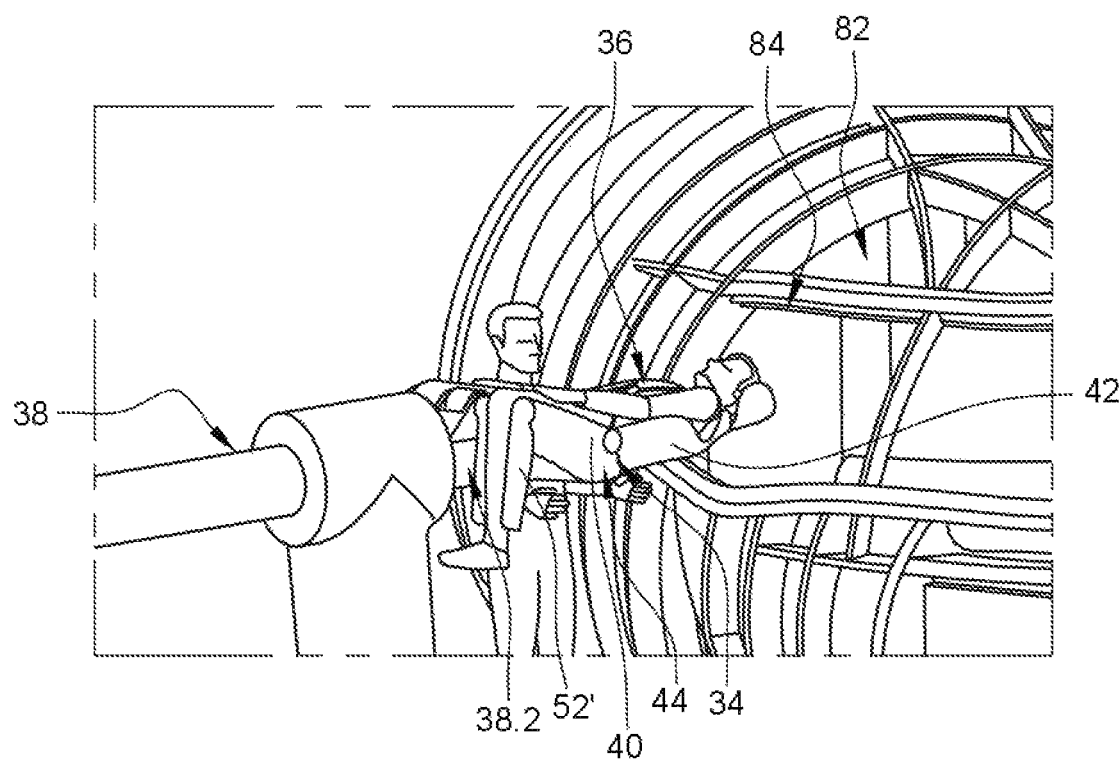
FIG. 8 is a perspective view of the aerial workstation of FIG. 3, with a backrest in the reclined position, before being introduced into a cockpit of an aircraft.

The seat 34 has a sitting portion 40, a backrest 42, and a first articulation 44 connecting the backrest 42 and the sitting portion 40, configured to allow the backrest 42 to be able to move relative to the sitting portion 40, between a raised position, shown in FIG. 6, in which the backrest 42 and the sitting portion 40 form approximately a right angle, and a reclined position, shown in FIG. 8, in which the backrest 42 and the sitting portion 40 form an angle of greater than 150°.

The first articulation 44 is a pivoting connection and has a first pivot axis A44 that is oriented such that the backrest 42 and the sitting portion 40 pivot with respect to one another between the raised and reclined positions.

For the remainder of the description, a transverse direction is parallel to the first pivot axis A44 of the first articulation 44.

Figure 5:
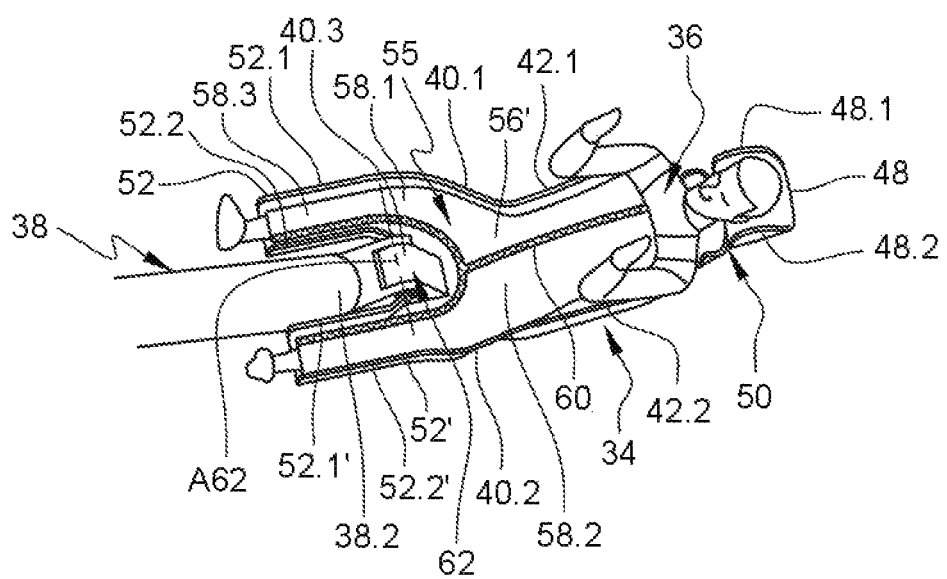
FIG. 5 is a perspective view of a seat of an aerial workstation equipped with a harness of the wraparound type which illustrates one embodiment of the invention.

According to one embodiment, shown in FIG. 5, the seat 34 is a bucket seat. Thus, the sitting portion 40 is in the shape of a gutter and comprises curved right and left lateral edges 40.1, 40.2 that are configured to stop the pelvis and the upper legs (from the pelvis to the knee) of the operator 36 from moving transversely during operation. The backrest 42 is also in the shape of a gutter and comprises curved right and left lateral edges 42.1, 42.2 that are configured to stop the torso of the operator 36 from moving transversely during operation. According to one arrangement, the lateral edges 42.1, 42.2 of the backrest 42 each comprise a setback 46 that is configured to free up each shoulder of the operator 36 during operation and to not impede the movements of their arms.

According to one configuration, the seat 34 comprises a headrest 48 and a second articulation connecting the headrest 48 to the backrest 42. This second articulation 50 is configured to adjust an inclination between the headrest 48 and the backrest 42, and or a spacing between the headrest 48 and the backrest 42 in order to adjust the dimensions of the seat 34 to different morphologies of an operator 36. According to one embodiment, the second articulation 50 comprises a second pivot axis A50 that is parallel to the first pivot axis A44. According to one arrangement, the headrest 48 comprises two lateral supports 48.1, 48.2 that are configured to stop the head of the operator 36 from moving transversely during operation.

According to one configuration, the seat 34 comprises two leg rests 52, 52', one for each lower leg, and two third articulations 54, 54' connecting the leg rests 52, 52' to the sitting portion 40. For each leg rest, the third articulation 54, 54' is configured to adjust an inclination between the leg rest 52, 52' and the sitting portion 40 and/or a spacing between the leg rest 52, 52' and the sitting portion 40 in order to adjust the dimensions of the seat 34 to different morphologies of an operator 36 and also for greater comfort, and better transition between sitting portion starting position and working positions which are closer, in some cases, to a reclined position (in particular, in certain cases to better relate to the working environment, avoid contact with the structure of the aircraft, for example). According to one embodiment, each third articulation 50 comprises a third pivot axis A54, A54' that is parallel or slightly inclined with respect to the first pivot axis A44. According to one arrangement, each leg rest 52, 52' is in the shape of a gutter and comprises curved right and left lateral edges 52.1, 52.2; 52.1', 52.2' that are configured to stop the lower legs of the operator 36 from moving transversely during operation.

The sitting portion 40, the backrest 42, the headrest 48 and the leg rests 52, 52' are rigid elements, such as shells for example, which can be padded. By way of example, these rigid elements are made of plastic material or of composite material.

By way of example, each one of the first, second and third articulations 44, 50, 54, 54' comprises at least one hinge.

According to one embodiment, the seat 34 comprises at least one restraint system 55 for holding the operator 36 in the seat 34 whatever the orientation of the seat 34.

Figure 7:
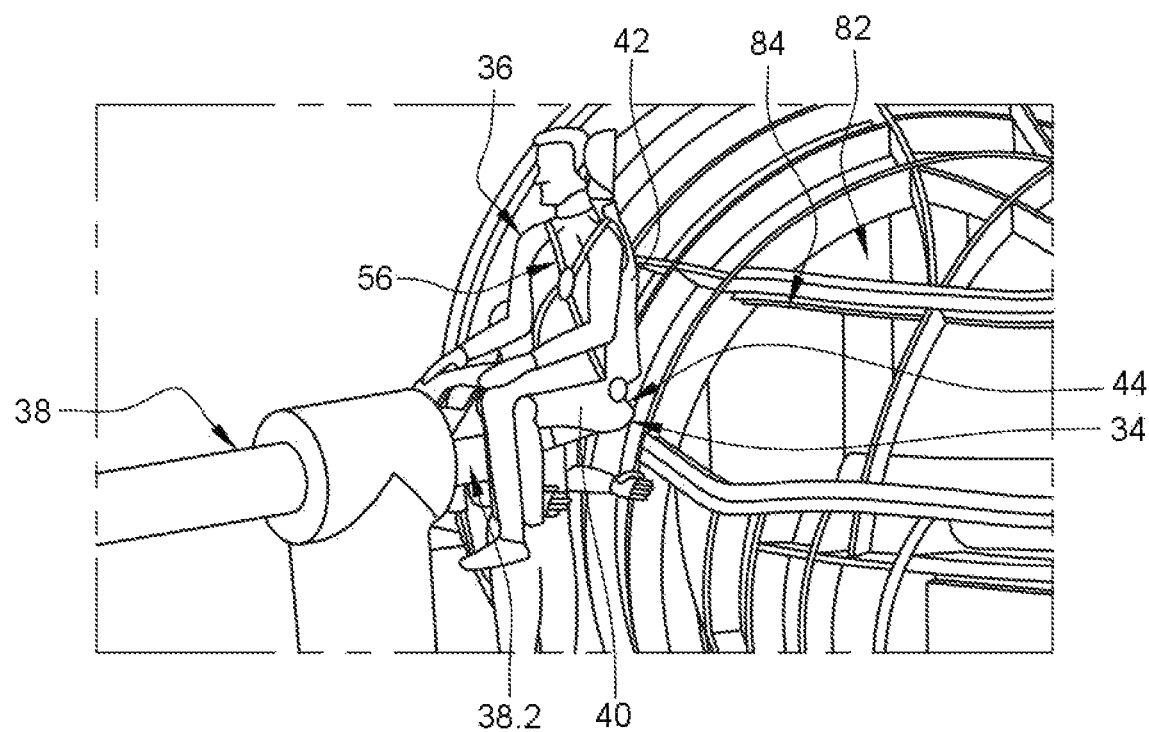
FIG. 7 is a perspective view of the aerial workstation of FIG. 3, with a backrest in the raised position and a sitting portion positioned at the level of an opening.
Figure 11:
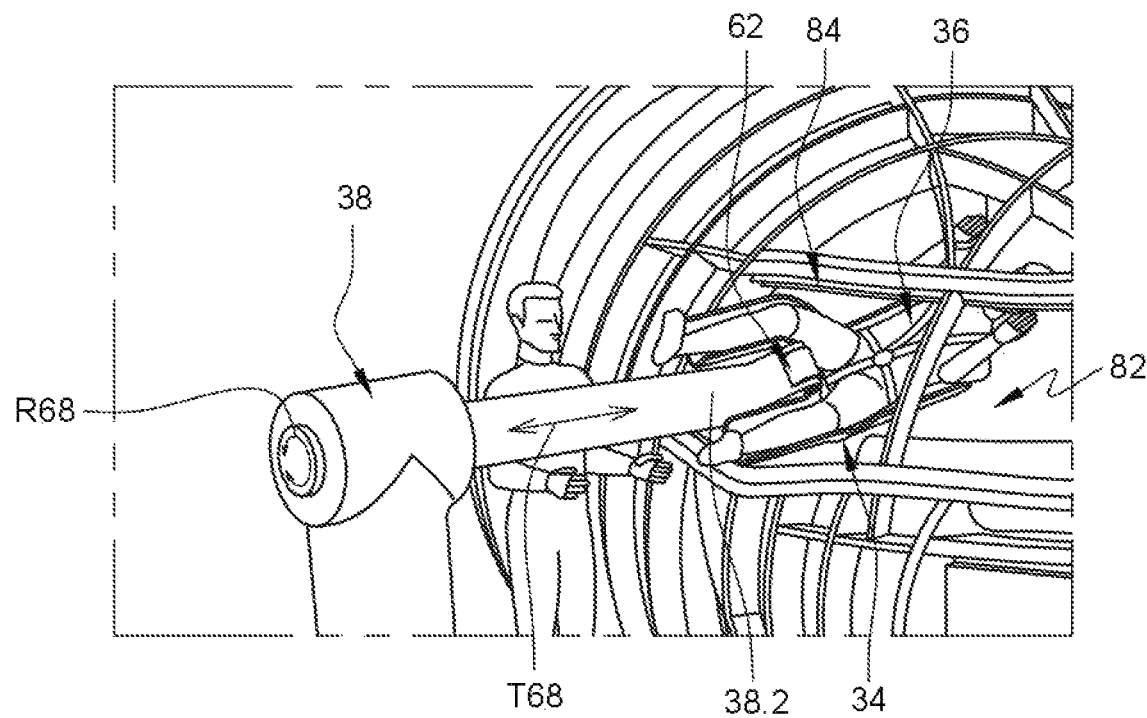
FIG. 11 is a perspective view of the aerial workstation of FIG. 3, in a second working position inside the cockpit.

According to one configuration, shown in FIGS. 7 and 11 for example, the restraint system 55 is a harness 56 of the four- or five-point type.

According to another embodiment, shown in FIG. 5, the restraint system 55 is a harness 56' of the wraparound type, configured to form, with the sitting portion 40 and part of the backrest 42, a sheath in which the operator 36 is positioned during operation in order to improve comfort for the operator. This harness 56 of the wraparound type can extend as far as the leg rests 52, 52' if these are present. According to one embodiment, the harness 56' comprises multiple parts, a right-hand part 58.1 connected to the right lateral edges 40.1, 42.1 of the sitting portion 40 and of the backrest 42 and to the right lateral edge 52.1 of the right leg rest 52 intended for the right leg of the operator 36, a left-hand part 58.2 connected to the left lateral edges 40.2, 42.2 of the sitting portion 40 and of the backrest 42 and to the left lateral edge 52.2' of the left leg rest 52' intended for the left leg of the operator 36, and a central part 58.3 connected to the left lateral edge 52.2 of the right leg rest 52 and to the right lateral edge 52.1' of the left leg rest 52', these various right-hand, left-hand and central parts 58.1 to 58.3 being connected to each other by at least one zipper 60. In addition to the wraparound harness, the seat 34 may comprise a strap for holding the head of the operator 36 against the headrest 48 when the operator 36 is in a ventral position, facing downwards.

Of course, the invention is not restricted to this embodiment for the restraint system 55.

According to one embodiment, shown in FIG. 3, the arm 38 comprises a first segment 64 that is oriented in a first direction and is connected to the base 32, a second segment 66 that is oriented in a second direction known as the longitudinal direction and is connected to the seat 34, and a first connection 68 connecting the first and second segments 64, 66. According to one arrangement, the first direction of the first segment 64 is approximately vertical and the second direction of the second segment 66 is essentially horizontal.

According to one configuration, the first connection 68 is configured to allow the second segment 66 to move in translation relative to the first segment 64 in a direction of translation T68 that is parallel to the longitudinal direction, and to pivot on itself relative to the first segment 64 about an axis of rotation R68 that is parallel to the longitudinal direction. The direction of translation T68 and the axis of rotation R68 coincide.

According to one embodiment, the first segment 64 is connected to the base 32 by a second connection 70 which is configured to allow the first segment 64 to translate with respect to the base 32 in a direction of translation T70 parallel to the vertical direction, and/or to pivot on itself with respect to the base 32 about an axis of rotation R70 parallel to the vertical direction.

According to one configuration, the workstation comprises a third connection 62 which connects the second end 38.2 of the arm 38 and the seat 34, which comprises at least one pivot axis and is configured to make the seat 34 pivot with respect to the arm 38 about said pivot axis. According to one embodiment, this third connection 62 comprises a pivot axis A62 (shown in FIG. 5) that is approximately parallel to the first pivot axis A44. According to one arrangement, the sitting portion 40 has a lower edge 40.3, the second end 38.2 of the arm 38 being connected to a central part of the lower edge 40.3, the leg rests 52, 52' being connected to the lower edge 40.3 of the sitting portion 40 and either side of the second end 38.2 of the arm 38.

Figure 12:
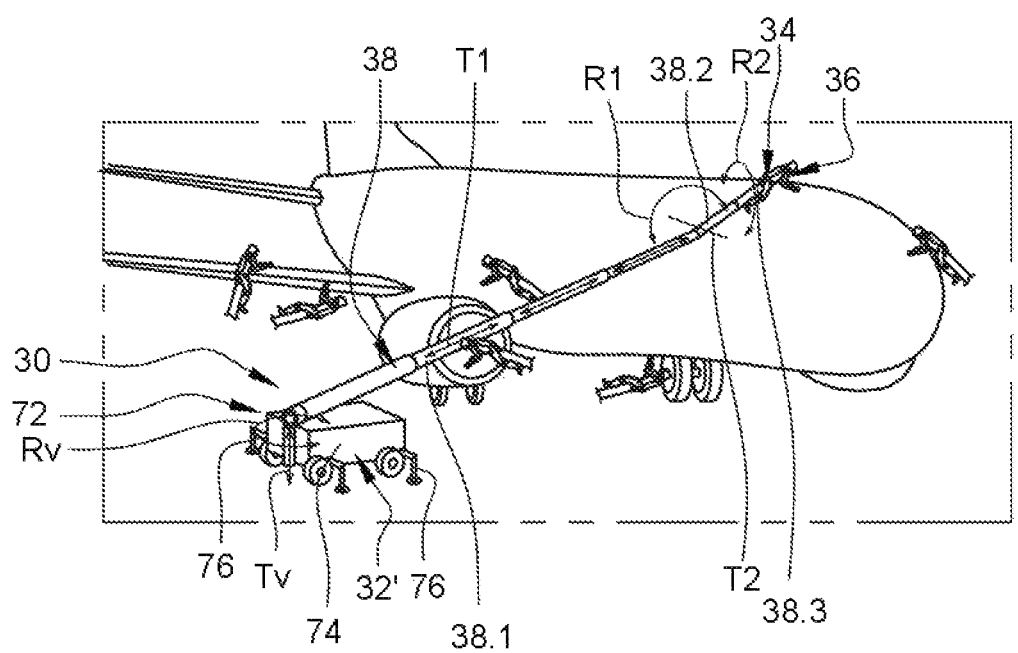
FIG. 12 is a perspective view of an aerial workstation, positioned at various locations around an aircraft, which illustrates a second embodiment of the invention.

According to another embodiment, shown in FIG. 12, the arm 38 is connected to a base 32' by a connection 72 which is configured to allow the arm 38 to translate with respect to the base 32' in a vertical direction of translation Tv, and/or to pivot on itself with respect to the base 32' about a vertical axis of rotation Rv. In addition, the arm 38 comprises three segments 38.1, 38.2, 38.3, a first segment 38.1 connected to the base 32' being telescopic and comprising multiple segments connected by connections that are configured to allow the segments to translate with respect to one another in a first direction of translation T1, the intermediate segment 38.2 being connected to the first segment 38.1 by a pivoting connection having a first axis of rotation R1 oriented in a second direction T2 perpendicular to the first direction T1, the final segment 38.3, connected to the seat 34, being connected to the intermediate segment 38.2 by a pivoting connection having a second axis of rotation R2 oriented in a third direction that coincides with the direction of the intermediate segment 38.2. According to another embodiment, the arm 38 comprises at least two segments, a first telescopic segment 38.1 and a final segment 38.3 connected to an upstream segment 38.2, oriented in an upstream direction, by a pivoting connection having an axis of rotation that coincides with the upstream direction.

Of course, the invention is not restricted to this embodiment for the arm 38, which is configured to position the seat 34 according to various positions and orientations in space, depending on requirements.

Whatever the embodiment, the arm 38 comprises at least one connection configured to allow the seat 34 to translate in at least one direction of translation, and/or to pivot about at least one axis of rotation. According one configuration, shown in FIG. 3, the arm 38 comprises at least one connection configured to allow the seat 34 to translate in at least one direction of translation, and to pivot about at least one axis of rotation that coincides with the direction of translation. According to one configuration, shown in FIG. 12, the arm 38 comprises at least one first connection configured to allow the seat 34 to translate in a direction of translation, and at least one second connection configured to allow the seat 34 to pivot about an axis of rotation that coincides with the direction of translation. This solution makes it possible to be able to translate the seat in a cockpit in an introduction direction, and to make it pivot on itself (about a pivot axis that is parallel with the direction of introduction) within the cockpit. The combination of the movements of the arm 38 and the pivoting movement between the sitting portion 40 and the backrest 42 makes it possible to obtain a polyarticulated aerial workstation 30 by means of which it is possible to position an operator 36 in various positions and orientations in space depending on requirements.

According to a first embodiment shown in FIG. 3, the base 32 is fixed and connected to the ground or to a fixed frame.

According to a second embodiment shown in FIG. 12, the base 32' is mobile and comprises a mobile trolley 74 having wheels and a stabilizing system 76. Of course, the invention is not restricted to these two embodiments for the base 32, 32'.

Each articulation 44, 50, 54, 54' of the seat 34, and/or each connection 62, 68, 70, 72 of the arm 38 is motorized. The aerial workstation comprises a controller 78 for commanding each articulation 44, 50, 54, 54' of the seat 34, and/or each connection 62, 68, 70, 72 of the arm 38.

According to a first control mode, the aerial workstation 30 comprises at least one control 80 which is connected to the controller and by means of which it is possible to control the various movements of the seat 34 and of the arm 38. This control 80 can be used by the operator in place on the seat 34, or by a remote operator who is not seated on the seat 34. This control 80 can be manual, vocal or of another type.

According to one application, the operator 36 installed on the seat 34 must carry out various operations at various intervention points in a cockpit 82, each requiring a certain position and orientation of the seat 34. According to a second control mode, the movements of the arm 38 and of the seat 34 are programmed. The controller 78 comprises a program that it executes to move the seat 34 along a succession of intervention points, stopping at each one of the intervention points. The aerial workstation comprises at least one control configured to inform the controller 78 and to initiate a transfer from one intervention point to another. Thus, the operator 36 carries out at least one task at each intervention point. When this task is completed, the controller 78, informed by the operator 36 via a control, for example, moves the operator to a subsequent intervention point.

Figure 9:
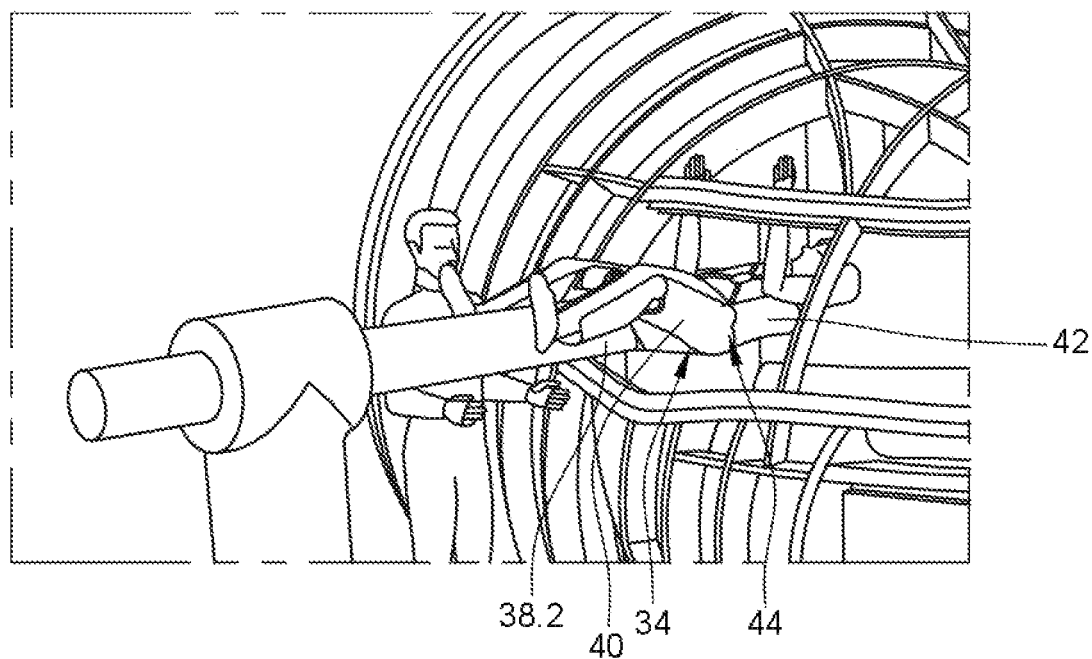
FIG. 9 is a perspective view of the aerial workstation of FIG. 3, with a backrest in the reclined position, after being introduced into the cockpit.
Figure 10:
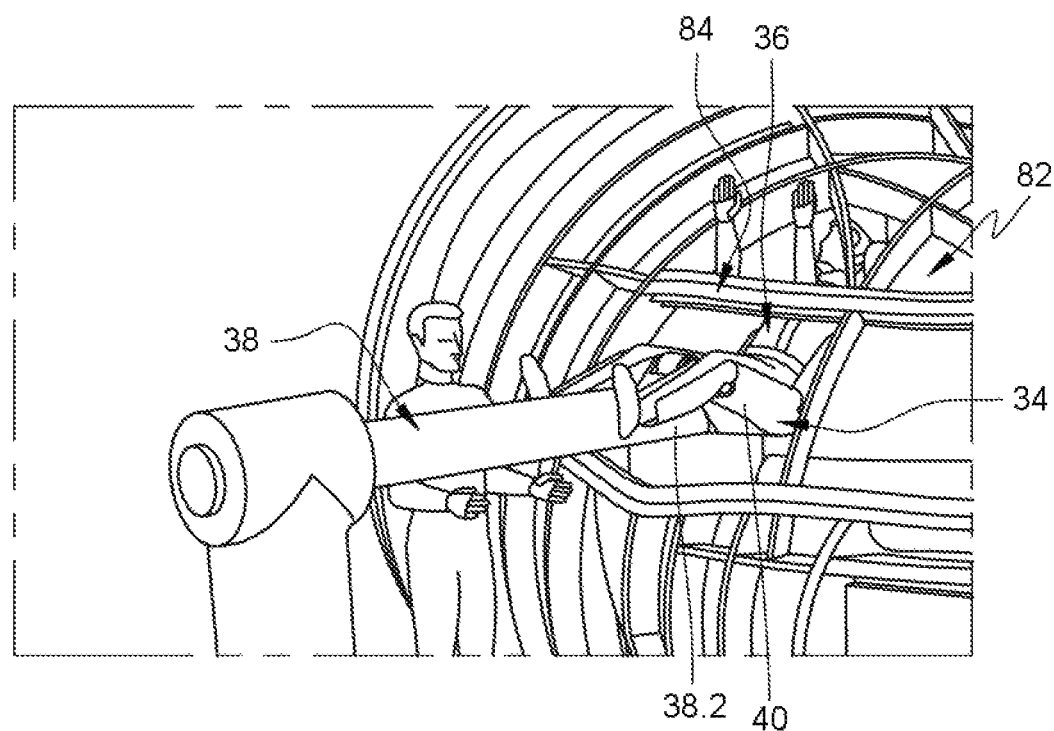
FIG. 10 is a perspective view of the aerial workstation of FIG. 3, in a first working position inside the cockpit.

According to one mode of operation, shown in FIGS. 6 to 11, the seat 34 is positioned at a starting point, at a certain height which allows an operator 36 to sit thereon, as shown in FIG. 6. With their harness 56 (shown in FIG. 7) buckled, the operator 36 initiates a cycle. The arm 38 raises the seat 34 in order to arrange the sitting portion 40 at an opening 84 of the cockpit 82, as shown in FIG. 7. The backrest 42 is tilted back into the reclined position, as shown in FIG. 8, then the leg rests 52, 52' are raised. In this position, the operator 36, positioned on the seat 34, can then be introduced into the cockpit 82 via an opening 84. The second segment 66 then carries out a movement of translation so as to position the operator 36 inside the cockpit 82, as shown in FIG. 9. By raising the backrest 42 to a greater or lesser degree, by translating the second segment 66 to a greater or lesser degree along the direction of translation T68, and/or by pivoting the second segment 66 about the axis of rotation R68, it is possible to position the operator 36 within the cockpit 82 in line with the various intervention points, as shown in FIGS. 10 and 11.

As previously indicated, the operator 36 carries out the task(s) at each intervention point; then, on completion thereof, the operator commands the controller 78 to be moved to another intervention point. When all of the tasks have been completed, the controller 78 causes the seat 34 to move to the starting point.

According to one application, the aerial workstation can be used to fasten objects at various intervention points in the cockpit 82. In order to facilitate the operations to be carried out by the operator 36, at each of the intervention points the objects to be fastened are pre-positioned relatively close to their theoretical position. Thus, the operator 36 has only to reposition, using one hand, the object that is to be fastened, then, with the other hand, install the fasteners using a suitable tool (a screwdriver, for example), the fasteners being already present in the object that is to be fastened.

A nose assembly station comprises at least one aerial workstation 30, preferably two, which makes it possible for two operators 36 to work simultaneously: a first operator 36, introduced via a first opening located on a first side of a vertical median plane of the cockpit 82, carrying out the operations located in a first region located on the first side, a second operator, introduced via a second opening located on a second side of the vertical median plane, carrying out the operations located in a second region located on the second side.

Of course, the use of the aerial workstation 30 is not restricted to assembling an aircraft nose. As shown in FIG. 12, the aerial workstation 30 can allow an operator to safely work on various elevated parts of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerial workstation, comprising:
   a seat having a sitting portion, a backrest, a restraint system configured to hold an operator on the seat during operation, and a first articulation connecting the backrest and the sitting portion, configured to allow the backrest to be able to move relative to the sitting portion, between a raised position in which the backrest and the sitting portion form approximately a right angle, and a reclined position in which the backrest and the sitting portion form an angle of greater than 150°, and
   an arm having a first end connected to a base and a second end connected to the seat, comprising:
      at least one connection configured to allow the seat to translate in at least one direction of translation, and to pivot about at least one axis of rotation that coincides with the direction of translation, or
      at least one first connection configured to allow the seat to translate in a direction of translation, and at least one second connection configured to allow the seat to pivot about the at least one axis of rotation that coincides with the direction of translation,
      wherein the at least one axis of rotation is laterally offset from the seat.

2. The aerial workstation according to claim 1, wherein the workstation comprises an articulation which connects the second end of the arm and the seat and is configured to make the seat pivot with respect to the arm about a pivot axis.

3. The aerial workstation according to claim 1, wherein the seat is a bucket seat.

4. The aerial workstation according to claim 1,
   wherein at least one of each articulation of the seat or each connection of the arm is motorized, and
   wherein the aerial workstation comprises a controller for commanding at least one of each articulation of the seat or each connection of the aim.

5. The aerial workstation according to claim 1, wherein the controller comprises a program that is configured to move the seat along a succession of intervention points, immobilizing the seat at each one of the intervention points.

6. The aerial workstation according to claim 1, wherein the aerial workstation comprises at least one control configured to inform the controller so that the controller initiates a transfer from one intervention point to another.

7. An assembly station for an aircraft nose, comprising at least one aerial workstation according to claim 1.

8. An aerial workstation, comprising:
   a seat having a sitting portion, a backrest, a restraint system configured to hold an operator on the seat during operation, and a first articulation connecting the backrest and the sitting portion, configured to allow the backrest to be able to move relative to the sitting portion, between a raised position in which the backrest and the sitting portion form approximately a right angle, and a reclined position in which the backrest and the sitting portion form an angle of greater than 150°, and an arm having a first end connected to a base and a second end connected to the seat, comprising:
- at least one connection configured to allow the seat to translate in at least one direction of translation, and to pivot about at least one axis of rotation that coincides with the direction of translation, or
- at least one first connection configured to allow the seat to translate in a direction of translation, and at least one second connection configured to allow the seat to pivot about the at least one axis of rotation that coincides with the direction of translation, wherein the arm comprises at least one first segment oriented in a first direction and connected to the base, a second segment oriented in a second direction and connected to the seat, and a first connection that connects the first and second segments and is configured to allow the second segment to translate with respect to the first segment in a direction of translation parallel to the second direction and to pivot on itself with respect to the first segment about an axis of rotation parallel to the second direction.

9. The aerial workstation according to claim 8, wherein the arm comprises a second connection which connects the first segment and the base and is configured to allow the first segment to at least one of translate with respect to the base in a direction of translation parallel to a vertical direction, or to pivot on itself with respect to the base about an axis of rotation parallel to the vertical direction.

10. The aerial workstation according to claim 8, wherein the second direction is essentially horizontal.

11. An aerial workstation, comprising:

a seat having a sitting portion, a backrest, a restraint system configured to hold an operator on the seat during operation, and a first articulation connecting the backrest and the sitting portion, configured to allow the backrest to be able to move relative to the sitting portion, between a raised position in which the backrest and the sitting portion form approximately a right angle, and a reclined position in which the backrest and the sitting portion form an angle of greater than 150°, and an arm having a first end connected to a base and a second end connected to the seat, comprising:
- at least one connection configured to allow the seat to translate in at least one direction of translation, and to pivot about at least one axis of rotation that coincides with the direction of translation, or
- at least one first connection configured to allow the seat to translate in a direction of translation, and at least one second connection configured to allow the seat to pivot about the at least one axis of rotation that coincides with the direction of translation, wherein the restraint system is a harness of a wraparound type, configured to form, with the sitting portion and part of the backrest, a sheath in which an operator is positioned during operation.

\* \* \* \* \*